Patented Dec. 12, 1944

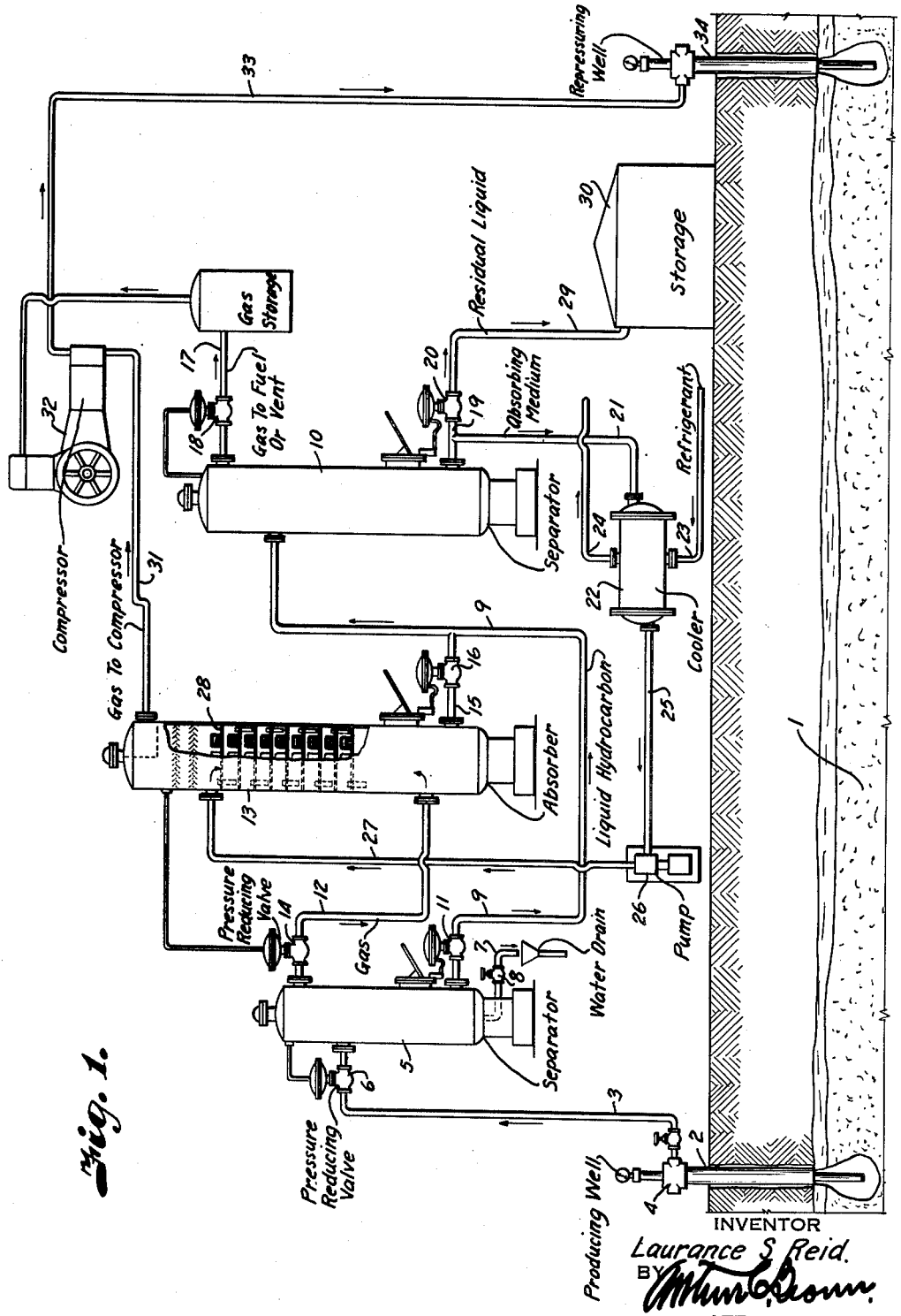

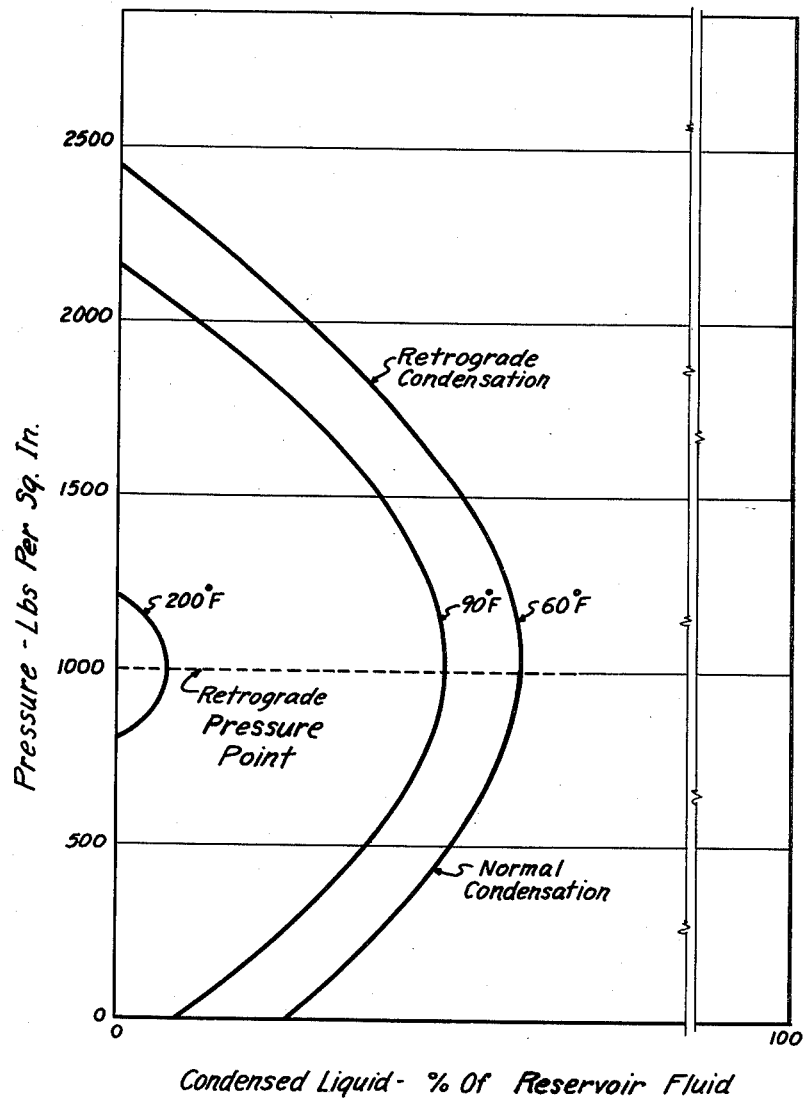

2,364,660

UNITED STATES PATENT OFFICE 2,364,660

METHOD OF AND APPARATUS FOR RECOVERING DESIRABLE PETROLEUM HYDROCARBON FRACTIONS FROM HIGH PRESSURE WELLS

Laurance S. Reid, Oklahoma City, Okla.

Application January 20, 1939, Serial No. 251,952

12 Claims. (Cl. 62—175.5)

This invention relates to a method of and apparatus for recovering desirable petroleum hydrocarbon fractions from high pressure wells; particularly those fractions whose combination is known as "distillate" and which, under high subsurface temperatures and pressures, are usually contained in the reservoir and well stream in the vapor phase; having for its principal object the effective and economical recovery of said fractions at high pressures.

It has been discovered that, in high pressure "distillate" pools, extensive vaporization of some of the lighter hydrocarbon liquids has occurred and that these hydrocarbons are produced along with the non-condensable gases in a vapor state. Also it is known that the gradual reduction in pressure which attends the production of gas from a pool of this type causes the condensation of the heavier hydrocarbon liquids from the vapor state directly in the formation, even though the pressures still are extremely high and the reservoir temperature has not been lowered sufficiently to cause condensation. This behavior is explained by the recent discovery that when a hydrocarbon liquid of mixed composition is in contact with vapors thereof and uncondensable gases and subjected to increasingly high pressures under constant temperature conditions, starting in the vicinity of approximately 800 pounds per square inch pressure, the liquid will start to vaporize into the gaseous phase in increasing amounts as the pressure is increased and that, when the pressure is again reduced toward the original pressure, condensation results in increasing amounts. This phenomenon is usually referred to as retrograde or receding vaporization and condensation and takes place as the pressure is either raised or lowered through the critical region wherein this phenomenon is observed.

The phenomenon of retrograde condensation has been observed in producing gas-distillate and/or oil wells which have been completed in reservoirs whose formation pressures have been found to range from 1000 to 8000 pounds per square inch. As set forth above, retrograde phenomena are observed as the temperature and pressure of a hydrocarbon system approaches critical values and recent investigation has shown that the critical pressure of naturally occurring hydrocarbon reservoir fluids may vary from 2000 to more than 25,000 pounds per square inch, depending upon the composition of the fluid. My invention, which is described herein, finds its principal application to the production of hydrocarbon liquids from high pressure wells of this general classification and particularly to gas-distillate wells having well head pressures of 1000 pounds per square inch and greater; utilizing the principle of retrograde condensation, which must follow the retrograde vaporization of hydrocarbon liquids which have been subjected to formation pressure and temperature conditions; said retrograde condensation being caused by a reduction of that pressure.

Under present conditions the great volume of gas produced with a profitable quantity of distillate or condensate is usually unsaleable, and since the maintenance of formation pressure is necessary and desirable in order to prevent condensation within the reservoir to produce a maximum ultimate yield from wells drilled on wide spacing, and to vaporize or absorb any liquid hydrocarbons existing in the reservoir, it is recommended that the gas be returned to the producing horizon, after being denuded of its liquefiable content, in order to maintain this pressure. The distillate fraction has heretofore been recovered, in part, through reduction in pressure of the well stream to a relatively low point well within the normal condensation range of the gas-distillate system. It is then necessary to recompress the gas so that it can be returned to the formation. Such practice, however, is not economical because of the lower recovery of the liquefiable fractions and the expensive equipment made necessary through low operating pressures and the necessity of raising the pressure of the denuded gas to the high pressure maintained in the reservoir.

Since the discovery of the retrograde behavior of hydrocarbon systems, it has been found that the principle of retrograde condensation can be utilized to great advantage in recovering the desirable, liquefiable fractions from the well stream. These fractions can be recovered most effectively at the comparatively high pressure at which the effects of both normal and retrograde condensation reach a maximum, thereby greatly lowering the pressure differential between the denuded gas and the desired injection pressure. Consequently, smaller and less expensive compressor equipment may be used and operated with less power consumption.

In carrying out my invention, I therefore utilize the principles of retrograde condensation in combination with the principles of absorption at retrograde pressures, and thereby effect greater recovery of the desirable fractions, in a more efficient and economic manner.

In accomplishing these and other objects of the invention, as hereinafter set forth, I have provided improved method and apparatus, illustrated in the accompanying drawings, wherein:

Fig. 1 is a flow diagram of a condensate accumulation and absorption system adapted to operate at retrograde pressure and in accordance with my invention.

Fig. 2 is a graph of the retrograde condensation and vaporization characteristics of a hydrocarbon system.

Referring more in detail to the drawings:

1 designates a sub-surface formation containing petroleum hydrocarbons under high pressure and temperature which may be sufficiently high to have caused retrograde vaporization of desirable distillate fractions from any liquid hydrocarbon which may exist in the reservoir, and 2 designates a producing well drilled into the formation, and wherethrough the formation fluid is discharged usually as a mixture of gas containing the desirable fractions, oil, water, and the like, under formation pressure.

The flow from the well is delivered through a conduit 3, connecting the well head 4 with a high pressure separator 5 under control of a pressure reducing and regulating valve 6, so that the fluid is delivered into the separator at a pressure and temperature well above the freezing point of any gas-hydrates contained in the well stream, for example, a pressure substantially exceeding the retrograde pressure point of the well stream. This reduction in the pressure of the well flow results in partial dehydration of the stream by means of expansion thereof and partial liquefaction of distillate and hydrates at a pressure above the retrograde pressure point, thereby increasing the flexibility of the subsequent recovery process.

The separator 5 may be of any standard construction capable of effecting separation of the gas from the liquid components and subsequent separation of the liquid hydrocarbon phase from the aqueous phase; the water being drawn off through a conduit 7, preferably under control of a valve 8, while the hydrocarbon liquid is discharged through a conduit 9 connected with a second separator 10 and under control of a valve 11.

The gas component of the flow, containing the remaining desirable distillate fractions, is discharged from the top of the separator through a conduit 12 to an absorber 13, under control of a pressure reducing valve 14 set at the retrograde pressure point of the hydrocarbon gas entering the absorber.

The principle of recovery employed in the absorber 13 is based on the retrograde behavior of the hydrocarbon systems, found in high pressure petroleum and natural gas reservoirs as above noted, when the original formation pressure is reduced. A simple graphical interpretation of the retrograde behavior of a hydrocarbon system is presented in Fig. 2 where a hypothetical case has been assumed for the purpose of illustrating the behavior of the hydrocarbon fluid in the retrograde region; upon which behavior my invention is based.

As shown by the graph, the volume of condensed liquid expressed as per cent of the total reservoir fluid is plotted against the reservoir pressure. The temperature isobars indicate the amount of reservoir fluid which exists in the liquid phase at given temperatures and pressures. Referring to the 60° F. isobar, it will be seen that, as the pressure is raised above zero pounds gauge, normal condensation takes place and the volume of condensed liquid reaches a maximum at 1000 pounds gauge pressure. Pressure increase above 1000 pounds per square inch results in decreasing or receding condensation. As the pressure is increased to 2500 pounds per square inch at 60° F. it will be observed that the liquid phase vanishes and the system is composed of one homogeneous fluid phase. As above stated the condensation effected in the absorber is based on this principle where the condensation occurs through lowering of the pressure to the retrograde pressure point, for example 1000 pounds per square inch pressure, thereby effecting phase equilibrium of hydrocarbon vapor and liquid at this pressure so that a maximum liquid accumulation may be obtained in the absorber.

The conduit 12 is connected with the base of the absorber 13 wherein the desirable fractions condense.

Some of the lighter desirable fractions do not condense at the retrograde pressure point and I therefore provide for directly contacting the gas stream with an absorbing medium moving in counter-current flow therewith. The gas is, thereby, denuded of the recoverable fractions which gravitate along with the absorbing medium to the bottom of the absorber where they are discharged through a conduit 15, under control of a valve 16; the discharge of the line 15 being connected with the discharge line 9 of the high pressure separator so that the liquid stream containing the absorbent and condensed distillate is flashed into the low pressure separator 10 which may operate at a pressure ranging from 0 to 500 pounds per square inch absolute; thereby denuding the liquid of its dissolved gas and highly volatile components and rendering it available for use as the absorbent medium for the desirable hydrocarbons remaining in the vapor phase in the absorber.

The gas evolved in the separator 10 is discharged through a conduit 17 under control of a back-pressure regulator 18, whereby the predetermined flashing pressure is maintained. The residual liquid, after being relieved of a portion of the light fractions, is discharged from the bottom of the separator through a flow line 19 under control of a valve 20. A portion of said liquid is utilized as the absorbent medium; this portion being delivered through a branch line 21 that is connected with the line 19 ahead of the valve 20, and which leads to a cooler 22 where the temperature of the absorbent liquid is reduced by heat interchange relation with a suitable refrigerant having inlet and outlet connections 23 and 24 respectively. Chilled absorbent is then delivered through a line 25 connected with the intake of a pump 26 which raises the pressure of the absorbing liquid slightly above the absorber pressure which discharges it through a line 27 leading to the top tray 28 of the absorber. The absorbing liquid therefore flows onto the top bubble tray of the absorber and through the succeeding trays and in direct contact, but in counter-current flow, with the rising stream of gas.

When the absorbing medium, namely the partially denuded condensate whose density has been increased by flashing, is delivered in counter-current flow to the ascending gases, it is at a pressure approaching the critical pressure of the gas-distillate system. The liquid density will tend to decrease to a point where it will approach the density of the vapor since, at critical temperature pressure, the density of the liquid and gaseous phases becomes identical. In order for the liquid density to decrease, a portion of the vapor phase must dissolve into the liquid and, since the solubility of the homologous series of lighter hydrocarbons in a hydrocarbon liquid of higher molecular weight varies directly with increase in molecular weight of the components in the vapor phase, it follows that the heavier hydrocarbons in the vapor phase will be more soluble and will be selectively dissolved by the absorbing medium. This feature is essential to the process described herein. The cooling of the absorbing liquid prior to its introduction in the absorber tends to increase the driving force, thereby hastening the approach to an equilibrium condition between the vapor and liquid phases. As the descending liquid becomes enriched, its absorbent capacity decreases so that, at the base of the absorber, it displays an affinity only for the heavier fractions in the gas stream; the remaining traces of those heavier fractions and the bulk of the lighter constituents being removed as the gas is contacted by the progressively leaner liquid on successive bubble trays toward the top of the column. The absorbent, containing the absorbed fractions, is again recirculated through the low pressure separator 10 where the extremely light fractions are flashed out and the heavier fractions in liquid form are discharged through the line 19, a part of which continues recirculation through the cooler for reuse as an absorbent. The remainder of the condensate flows through a connecting line 29 to a storage 30 under control of the valve 20. The gas, denuded of condensate in the absorber, is delivered through a gas line 31 connected with the top of the absorber and leading to compressors 32 which raise the pressure of the gas from approximately the retrograde pressure point to the required injection pressure; whereupon the gas is returned to the formation through a conduit 33 leading to an injection well 34, drilled into the formation as in conventional practice.

It is therefore obvious that since the pressure differential on the respective sides of the compressor unit is low, smaller compressor units may be employed and operated with less power than would be the case where the denuded gas is dropped to lower pressures in the normal condensation range. It is further obvious that the utilization of the combined principles of retrograde condensation and absorption provide for maximum recovery of the desirable fractions.

What I claim and desire to secure by Letters Patent is:

1. The method of recovering desirable, liquefiable fractions from petroleum hydrocarbon gas including passing the gas through a high pressure condensing zone, effecting a liquid and vapor phase equilibrium in said zone at that pressure at which both retrograde and normal condensation reach a maximum in order to effect maximum condensation of said fractions, flashing the condensate into a low pressure zone to separate readily vaporizable components from said condensate, chilling a portion of said denuded condensate, and returning said chilled portion of the denuded condensate to said high pressure condensing zone in counter-current flow through a plurality of bubble stages with respect to the gas for absorbing desirable fractions remaining in the vapor phase at said pressure.

2. The method of recovering desirable, liquefiable petroleum hydrocarbons from a well flow including, reducing the pressure on said flow to a point somewhat above the retrograde pressure point of the well flow, separating liquids from the gas, passing the gas into a high pressure condensing and absorbing zone operating at the retrograde pressure point of the well stream to effect condensation of said desirable fractions, flashing the condensate into a low pressure zone to effect separation of the readily vaporizable components of the condensate leaving a denuded condensate, and recirculating a portion of the denuded condensate from said low pressure zone back to the high pressure condensing and absorbing zone in absorbing contact with said gas to effect absorption of any desirable fractions remaining in the vapor state in said high pressure condensing zone.

3. In an apparatus for recovering desirable, liquefiable hydrocarbon fractions from a well flow including a separator for separating aqueous and hydrocarbon liquid components from the gaseous components of said flow, an absorber, means discharging said gas from the separator into the absorber, means reducing pressure in the absorber within the retrograde condensation range for said well flow, a low pressure separator, means discharging separated liquid hydrocarbons from said high pressure separator to said low pressure separator, means discharging the condensate collecting in said absorber to said low pressure separator, and means circulating denuded condensate accumulating in said low pressure separator in counter-current flow with respect to the gas passing through the absorber for absorbing any desirable fractions which remain in the vapor phase at absorber pressure.

4. The method of recovering desirable liquefiable fractions from a gaseous flow of petroleum hydrocarbons including removing any free water contained in the gas while maintaining pressure above retrograde condensation range of said hydrocarbons, reducing the pressure within the retrograde condensation range to effect condensation of a portion of said liquefiable fractions, contacting an absorbing medium which has been prepared from the higher boiling fractions contained in the recovered condensate with the uncondensed gas while maintained in said pressure range to absorb remaining portions of said desirable fractions from said uncondensed gas, and preparing said absorbing medium from the higher boiling fractions contained in said recovered condensate 5. The method of recovering desirable liquefiable fractions from a continuous flow of petroleum hydrocarbon gas including reducing the pressure of said gas within the retrograde condensation range of said hydrocarbon gas to effect condensation of a portion of said desirable fractions, flowing an absorbing medium which has been prepared from the higher boiling fractions contained in the recovered condensate in counter-current flow with respect to the uncondensed gas while maintained in said pressure range to absorb remaining portions of said fractions from said uncondensed gas, and preparing said absorbing medium from the higher boiling fractions contained in said recovered condensate.

6. The method of producing desirable liquefiable petroleum hydrocarbons from a gaseous flow having pressure above retrograde condensation range of said hydrocarbons including separating any free water contained in said flow while maintaining said pressure, reducing said pressure within the retrograde condensation range of said hydrocarbons to effect condensation of a portion of said desirable fractions, circulating an absorbing medium which has been prepared from the higher boiling fractions contained in the recovered condensate in counter-current flow with said gaseous flow to effect absorption of any desirable fractions remaining in the vapor state, preparing said absorbing medium from the higher boiling fractions contained in said recovered condensate, compressing the denuded gas, and returning the gas to its source to maintain said original pressure.

7. The method of recovering desirable liquefiable fractions from a gaseous flow of petroleum hydrocarbons including reducing pressure of the flow within the retrograde condensation range of said hydrocarbons to effect condensation of said liquefiable fractions leaving a residue gas, contacting an absorbing medium which has been prepared from the higher boiling fractions contained in the recovered condensate with the residue gas while maintained in said retrograde condensation range to absorb the remaining portions of said desirable fractions from the residue gas, and preparing said absorbing medium from the higher boiling fractions contained in said recovered condensate.

8. A continuous method of recovering desirable liquefiable fractions from petroleum hydrocarbon gas including, passing the gas through a condensing zone maintained at high pressure within the retrograde condensation range of said hydrocarbon gas to effect condensation of said fractions leaving a residue gas, flashing the condensate into a low pressure zone to separate readily vaporizable components from said condensate, chilling a portion of denuded condensate, returning said chilled portion of the denuded condensate to said high pressure condensing zone, and contacting said denuded condensate with residue gas in said high pressure zone to absorb any desirable fractions remaining in the vapor phase at said pressure in the high pressure zone.

9. A continuous method of recovering desirable liquefiable fractions from petroleum hydrocarbon gas including, passing the gas through a separating zone, passing the gas from the separating zone to a condensing zone maintained at a high pressure within the retrograde condensation range of said hydrocarbon gas to effect condensation of said fractions leaving a residue gas, flashing the condensate into a low pressure zone to separate readily vaporizable components from said condensate, chilling a portion of said denuded condensate, returning said chilled portion of the denuded condensate to said high pressure condensing zone in counter-current flow with respect to flow of residue gas in said zone to absorb any remaining desirable fractions of the residue gas which remain in the vapor phase at said pressure, and returning the absorbing liquid collecting in said high pressure condensing zone to said flashing zone along with the condensate.

10. A continuous method of recovering desirable liquefiable petroleum hydrocarbons from a gaseous hydrocarbon flow including, separating liquid components of the flow, reducing the pressure within the retrograde condensation range of said gaseous flow to effect condensation of said liquefiable fractions leaving a residue gas, flashing the condensate into a low pressure zone to effect separation of the readily vaporizable components of the condensate, and recirculating a portion of the denuded condensate from said low pressure zone back to the zone of said condensation and in absorbing contact with residue gas to effect absorption of any desirable fractions remaining in vapor phase at said retrograde condensation pressure range.

11. In an apparatus for recovering desirable liquefiable hydrocarbon fractions from a gaseous flow including an absorber, means discharging said flow into the lower portion of the absorber, means reducing pressure in the absorber within the retrograde condensation range for said gaseous flow leaving a residue gas, a low pressure separator, means discharging condensate accumulating in said absorber to said low pressure separator, and means returning a portion of denuded condensate collecting in said low pressure separator to the upper portion of the absorber in counter-current contact with respect to residue gas in said absorber for absorbing desirable fractions that remain in vapor stage in said absorber.

12. In an apparatus for recovering desirable liquefiable hydrocarbon fractions from a gaseous well flow including an absorber, means discharging said flow into the lower portion of the absorber, means reducing pressure in the absorber within the retrograde condensation range of said flow to effect condensation from said flow and leaving a residue gas, a low pressure separator, means discharging the condensate accumulating in said absorber to said low pressure separator, means returning a portion of denuded condensate from said low pressure separator to the absorber at a point near the top thereof for counter-flow contact with respect to flow of the residue gas in the absorber for absorbing desirable fractions that remain in vapor state in said absorber, and means reducing temperature of said recirculated denuded condensate.

LAURANCE S. REID.